United States Patent [19]

Burnett, deceased et al.

[11] 4,450,073

[45] May 22, 1984

[54] AUTOMATIC WEIGHT GRADING AND SORTING APPARATUS

[76] Inventors: C. H. Burnett, deceased, late of Gainesville, Ga.; by Betty L. C. Burnett, administrator, Rte. #12, Box 489, Newton Dr., Gainesville, Hall Co., Ga. 30501

[21] Appl. No.: 334,177

[22] Filed: Dec. 24, 1981

[51] Int. Cl.[3] ........................ B07C 5/28; G01G 13/14

[52] U.S. Cl. .................................... 209/564; 209/593; 209/698; 209/912; 177/165; 198/365

[58] Field of Search ............... 209/592, 593, 595, 596, 209/645, 648, 912, 934, 646, 594, 564, 698; 104/172 B, 140; 198/365, 472, 505, 706; 364/567, 568, 582; 177/50, 145, 165

[56] References Cited

U.S. PATENT DOCUMENTS

| | | | |
|---|---|---|---|
| 1,199,184 | 9/1916 | Hubmann | 209/648 |
| 1,814,026 | 7/1931 | Draeger | 209/648 |
| 2,178,203 | 10/1939 | Fausel | 209/648 |
| 2,227,788 | 1/1941 | Loshak | 209/648 |
| 2,244,826 | 6/1941 | Cox | 209/646 |
| 2,355,715 | 8/1944 | Edington | 209/646 |
| 2,435,706 | 2/1948 | Barker | 209/648 |
| 2,679,317 | 5/1954 | Roop | 209/912 |
| 2,876,901 | 3/1959 | Roth | 209/648 |
| 2,980,252 | 4/1961 | Bray et al. | 209/646 |
| 3,545,614 | 12/1970 | Sheetz | 209/646 |
| 3,640,384 | 7/1972 | Del Rosso | 209/593 |
| 3,974,909 | 8/1976 | Johnson | 198/365 |
| 4,262,807 | 4/1981 | Leverett | 209/592 |

OTHER PUBLICATIONS

Acurex, Icore, Autochecker 2000, First Automatic Computing Checkweigher in the World, Acurex Corporation, pp. 1–11.

*Primary Examiner*—Robert B. Reeves
*Assistant Examiner*—Donald Hajec
*Attorney, Agent, or Firm*—Armstrong, Nikaido, Marmelstein & Kubovcik

[57] ABSTRACT

A weight grading and sorting apparatus including a base having a top surface, a plurality of trolleys riding on the top surface, each having a tippable cup and an endless conveyor mounted on the base engaging in conveying the plurality of trolleys around the top surface, a weighing device in the base including a portion of the top surface, and a control device in the base operatively associated with the weighing device and including a plurality of tippers at separate positions around the base adapted to selectively tip each cup at a certain position based on the weight of the contents thereof.

15 Claims, 6 Drawing Figures

AUTOMATIC WEIGHT GRADING AND SORTING APPARATUS

BACKGROUND OF THE INVENTION

1. Field of the Invention

The present invention relates to an apparatus for automatically weighing and sorting objects by their weight and distributing the same into specified locations. More specifically, the present invention relates to an apparatus for measuring portions of meat within a certain weight range and separately depositing each in an appropriate collection bin for a predetermined weight range.

2. Description of the Prior Art

In the fast-food industry, there has recently arisen a large demand for deboned chicken breasts. It is important that these pieces of meat be sorted and separated by weight. This is generally accomplished by individuals, each having an individual scale and a selection of bins in front of him. Each piece of meat is placed on a scale, weighed and tossed into the appropriate bin. This is labor-expensive and time-consuming.

Known in the art are certain mechanisms for sorting by weight. The most pertinent of these appears to be U.S. Pat. No. 1,199,184 to Hubmann, which discloses a fruit grader having means for selectively discharging fruit by weight. A plurality of individual containers ride on a wheel-like frame mounted to turn about a vertical shaft. The apparatus is provided with a mechanism for sizing the fruit by weight and selectively discharging the fruit from individual cups so as to group all fruit of the same grade and size into the same final container. Each individual cup is biased to remain in its upright position when empty. Upon placing fruit in the cup, the cup shifts slightly from its upright position, thereby placing an arm into position to encounter one of a number of curved bars mounted below the frame. Since the amount of tipping of the individual cups depends upon the weight of the individual piece of fruit, when the cup travels around the turntable, it encounters a differently positioned curved bar depending upon how far the cup is tipped. Upon encountering the bar, the arm actuates tipping of the cup by releasing a catch thereon, thereby depositing the fruit into an appropriately placed container. After depositing the fruit, the cup returns to its upright position simply by action of gravity on a weight mounted on a balance arm at the opposite end of the cup.

Other mechanisms are known for selective weighing and grading. These include U.S. Pat. No. 2,178,203 to Fausel. The apparatus includes a plurality of cup-shaped containers which traverse a closed loop path. Each container is tipped at a specific point along the loop, corresponding to the weight of the object contained in the container, thereby depositing its contents into a selected, appropriate container. The mechanism comprises a right-hand extension of an arm as shown in FIG. 9 of that patent having on its end a block which only covers a portion of the rod. Based on the weight of the object in the pan, the rod will tip about a pivot point to ride in one of a plurality of grooves. Each of these grooves has a pin extending radially outward therefrom at spaced intervals along the groove corresponding to the placement of the depository containers. As the rod rides into one of the grooves, the arm on the rod engages with the pin, turning the rod against the action of a counterweight to tip the cup to deposit the object in the appropriate container. As the rod continues further down the groove, the action of the counterweight swings the cup back to an upright position.

A further apparatus for selectively weighing and depositing objects is disclosed in U.S. Pat. No. 2,876,901 to Roth. This apparatus is a mechanism including a plurality of pans riding along a single rail wherein each pan with an object therein is held in an upright position by a rod which is caught in a groove on a circular disc mounted on a frame. The frame is suspended by a coil spring from a trolley riding on the rail. The weight of the object in the pan stretches the spring further, the heavier the object is. At various points along the rail, fingers are stationarily provided having different lengths. As the pan travels past a particular pin, the rod engages the finger. Upon this engagement, the rod is released from the groove in the disc, allowing the disc to rotate whereupon the pan tips, dumping the object into the desired container below. The action of the spring on the disc returns the pan to the upright position.

Also known is U.S. Pat. No. 2,244,826 to Cox which discloses a device for sorting objects by color. This apparatus includes an electromagnetic ejector mechanism which operates in conjunction with a color-sensing circuitry and a delay circuitry which provides electronically for the color of the object to be sensed in the sensing chamber and thereafter travel further around before being pushed from a cup by a desired one of a plurality of ejector hammers.

All of the above apparatuses have the disadvantage that they are complex to manufacture and difficult to clean. In the food processing industry, simplicity of mechanism and ease of cleaning are important considerations.

OBJECTS AND SUMMARY OF THE INVENTION

It is an object of the present invention to provide an apparatus for automatic weight grading and sorting of objects which is simple to manufacture.

It is a further object of the present invention to provide an apparatus for weight grading and sorting of food objects which is simple to clean.

It is yet another object of the present invention to provide such an apparatus which is simple to use and reliable.

Accordingly, the present invention is a weight grading and sorting apparatus comprising a base having a top surface, trolley means riding on the top surface having tippable means for carrying contents to be weighed and sorted, endless conveyor means mounted on the base for conveying the trolley means around the top surface, means in the base for individually successively weighing each of the trolley means and contents and means associated with the means for weighing for selectively tipping each means for carrying at a predetermined position remote from the means for weighing based on the weight of the contents.

The apparatus can further comprise a means mounted on the top surface for uprighting each tipped means for carrying after it has tipped its contents out.

The trolley means can comprise a plurality of trolleys riding on the top surface. Each trolley can include a frame, wheels rollingly mounted on the frame and a forward extension extending forwardly of the frame.

The tippable means on the trolley means can comprise a cup tippably mounted on the frame.

The top surface can have an oval-shaped slot therein. The endless conveyor means can comprise a drive gear rotatably mounted at one end of the base below the top surface, an idler gear rotatably mounted at the other end of the base below the top surface, means for driving the drive gear and an endless chain drivingly supported by the drive gear and the idler gear. The drive chain can have a plurality of drive members at spaced apart locations thereon. Each drive member extends through the slot and engages a portion of the trolley means.

The means for individually successively weighing can comprise a weighing deck positioned level with the top surface and in the path of the trolley means, a load cell totally supporting the weighing deck and a bracket fixed to the base supporting the load cell. The load cell produces an electrical signal proportionate to the weight of an object upon it.

The means for selectively tipping can include a plurality of tippers. Each tipper is located at a predetermined position. Each tipper comprises a vertically fixed rod, a tipping plate pivotally mounted at one end of the rod, a lever having two ends and being pivotally mounted between its ends on the rod, a connecting arm connected between one end of the lever and an intermediate portion of the tipping plate, and electrical means operatively associated with the means for weighing, including solenoid means mounted on the rod adjacent the other end of the lever. The solenoid means coacts with the lever to tip the tipping plate upon an appropriate signal.

The means for selectively tipping can also include a plurality of tipping means mounted at predetermined positions of the top surface, timing means associated with the conveyor means and control means electrically connected to the timing means and weighing means and operatively connected to the plurality of tipping means. The control means is provided for selectively operating one of the tipping means at the predetermined location to tip one of the tippable means based on the weight of the contents measured at the weighing means and the amount of time necessary for that particular tippable means to reach that particular predetermined location.

The entire apparatus can further include a tare means riding on the top surface having a weight equal to an empty tippable means, means in the weighing means for zeroing the weighing means and means associated with the conveyor means for signalling to the weighing means and the tipping means that the tare means is present on the weighing means.

The means for uprighting can comprise an arcuate rub rail mounted circumferentially of the top surface extending from the top surface. The height of the rub rail varies from the edge of the top surface to a level above the top surface sufficient to upright each tipped means for carrying as it successively rubs against the rail.

BRIEF DESCRIPTION OF THE DRAWINGS

The above and other objects and the attendant advantages of the present invention are readily apparent by reference to the following detailed description when considered in conjunction with the accompanying drawings wherein.

DETAILED DESCRIPTION OF A PREFERRED EMBODIMENT

Figure 1:
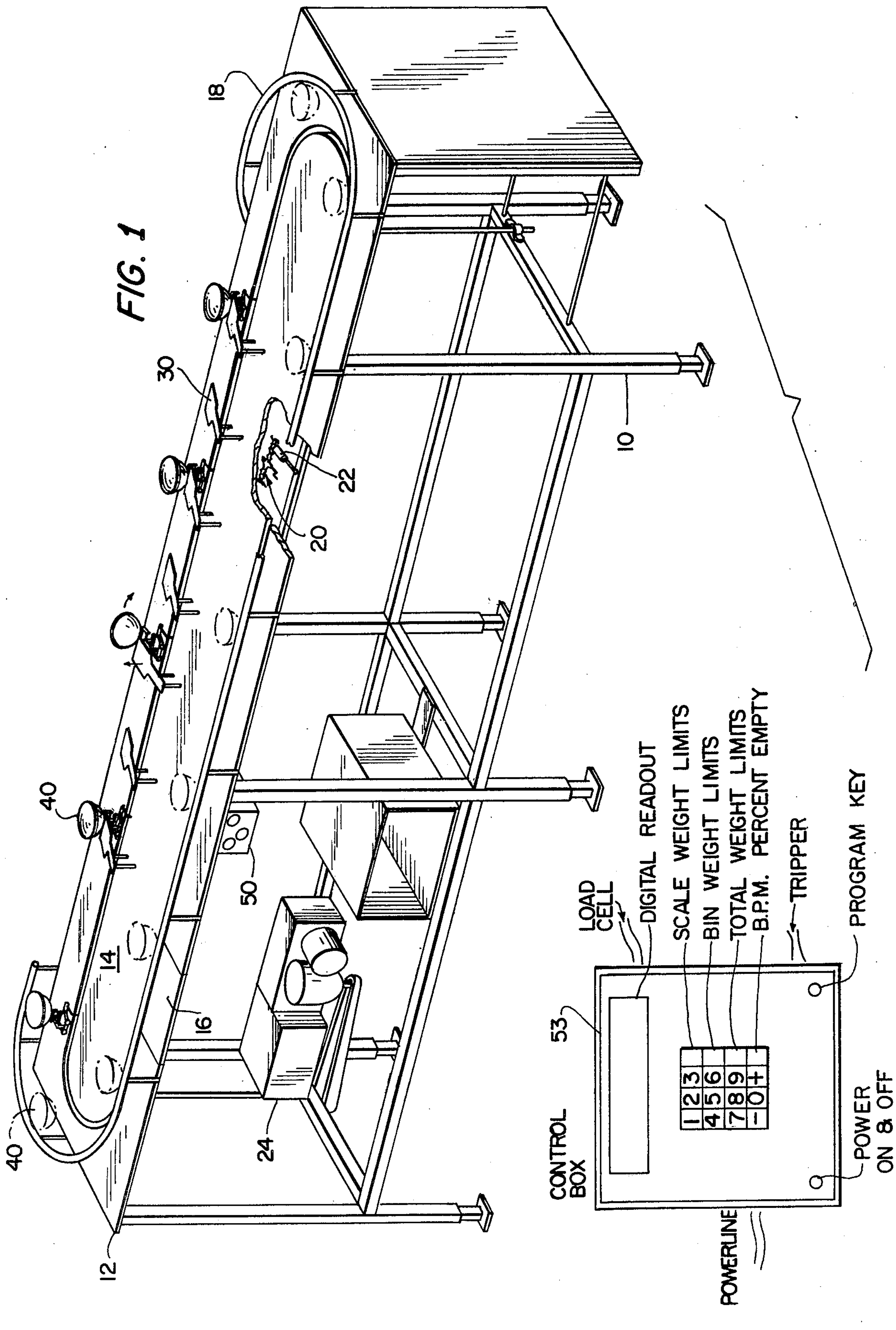
FIG. 1 is a perspective view of an apparatus in accordance with the present invention.

As can be seen in FIG. 1, the present invention basically consists of a frame 10 having mounted thereon a top surface 12 having a center section 14. Trolleys 40 ride on the top surface propelled by conveyor chain 20 supported on rollers 22. The conveyor chain 20 has extending pieces coacting with the front of each trolley 40. The conveyor chain is propelled by a drive means 24. Each trolley 40 successively passes over a weighing deck 16 whereupon it is weighed. The signal is sent to a control means 50, 53 which stores this information for action after a sufficient time for the trolley to move around in front of the appropriate one of the tippers 30. Upon reaching the appropriate tipper, the trolley 40 having a cup thereon is tipped by the tipper, thereby dumping the contents into a container placed on the floor below the top surface 12. The cup of the trolley 40 is thereafter pushed into an upright position by the rub rail 18.

Figure 2:
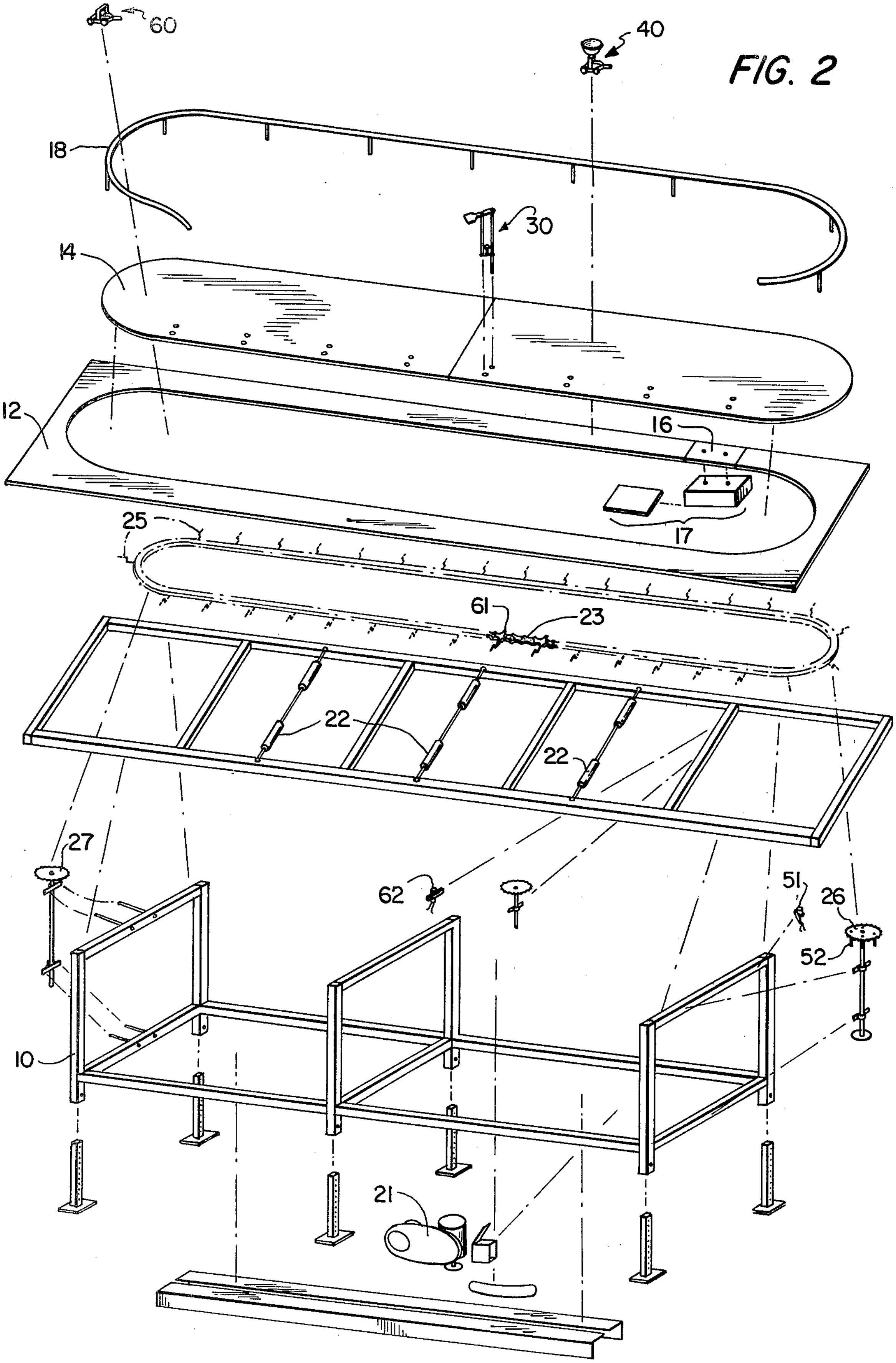
FIG. 2 is an exploded view of that apparatus.
Figure 6:
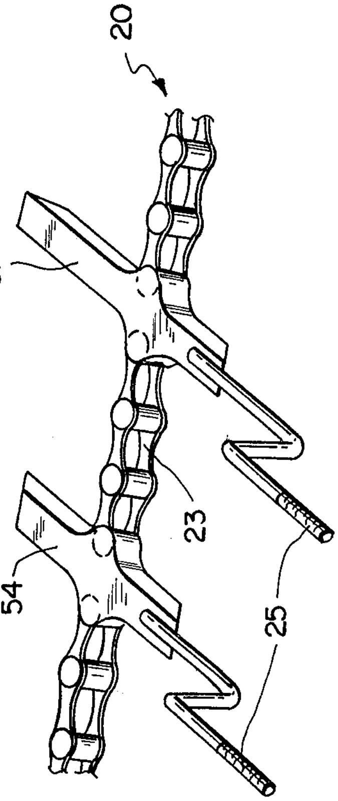
FIG. 6 is a partial perspective view of the conveying chain of the conveyor of the present invention.

FIG. 2 shows an exploded view of the present invention. The conveying system as can be clearly seen comprises a motor 21 driving a drive gear 26 which engages chain 23. Chain 23 is looped about drive gear 26 and idler gear 27 while being supported on rollers 22. The drive chain 23 has extensions 25 therefrom on the outer peripheral surface (FIG. 6) as well as timer extensions 54 opposite each of the driving extensions 25 except one, which has a tare indicator 61 (described further in detail hereinbelow).

Figure 3:
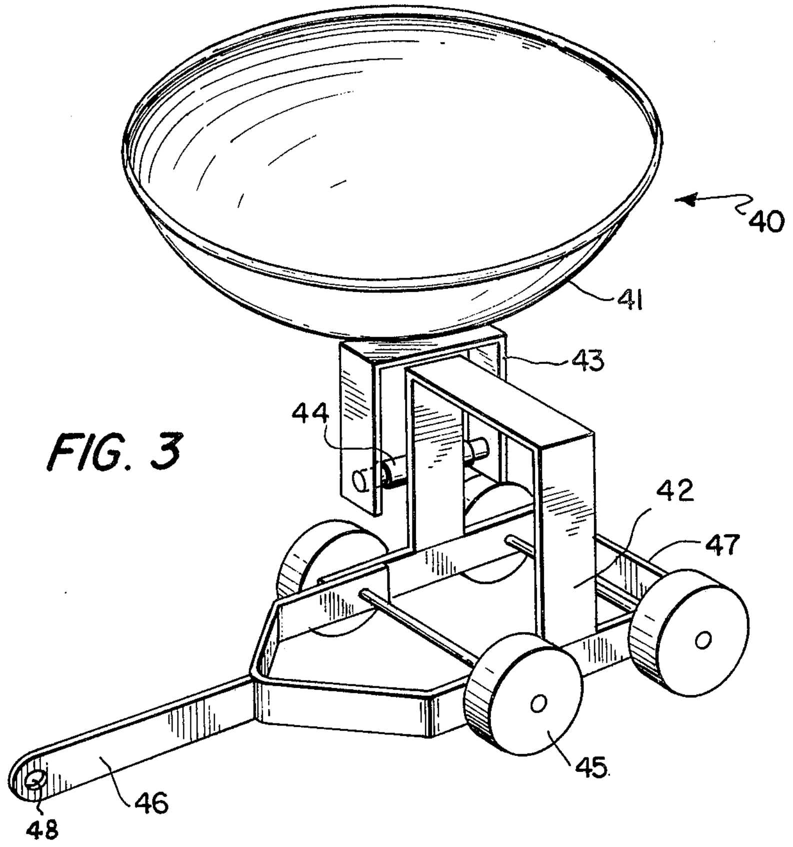
FIG. 3 is a perspective view of one of the trolleys.
Figure 4:
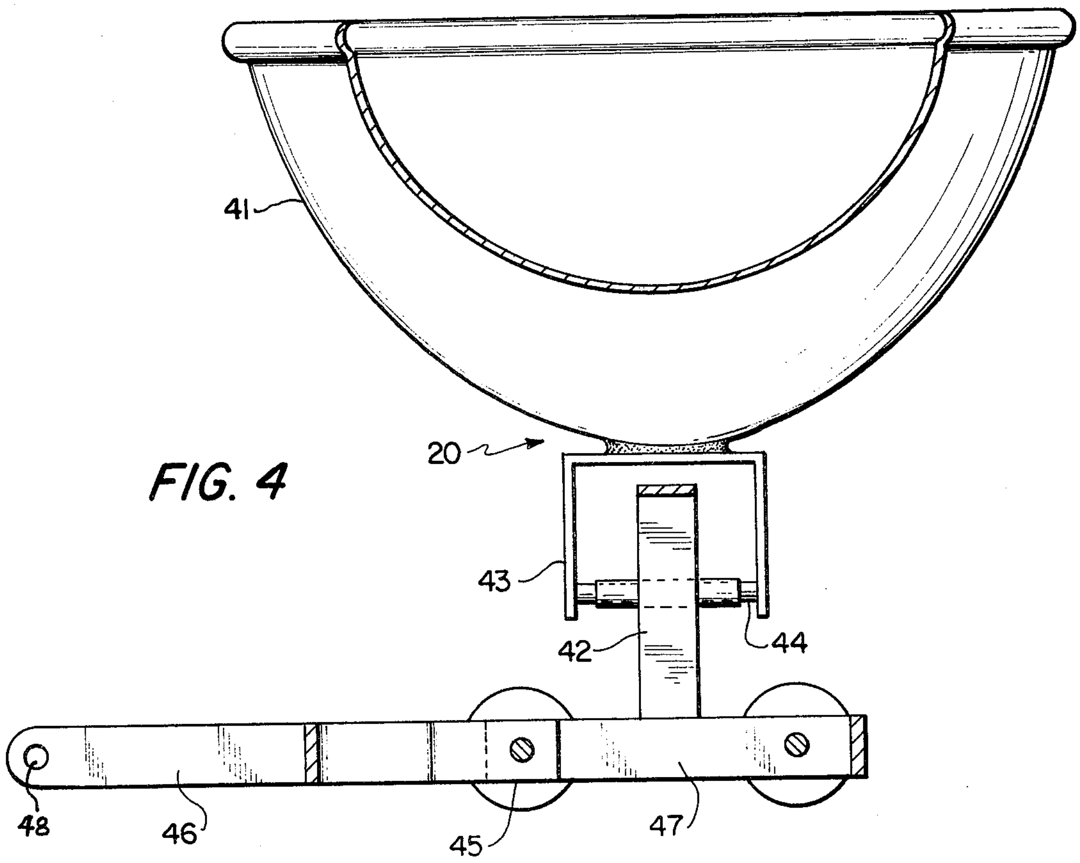
FIG. 4 is a cross-sectional view of one of the trolleys.

As can be seen in FIGS. 3 and 4, each trolley 40 has a cup 41 mounted on a bracket 43 pivotally mounted on shaft 44. Shaft 44 is carried by frame 42 mounted on trolley body 47. Trolley body 47 is carried on wheels 45 and has an extension member 46 extending from the front end thereof. The extension member 46 has a hole 48 therein into which engages the driving extension 25 of the chain. Thus, each trolley is driven around the top surface 12 by the conveyor chain 23 without having any additional weight added thereto.

Figure 5:
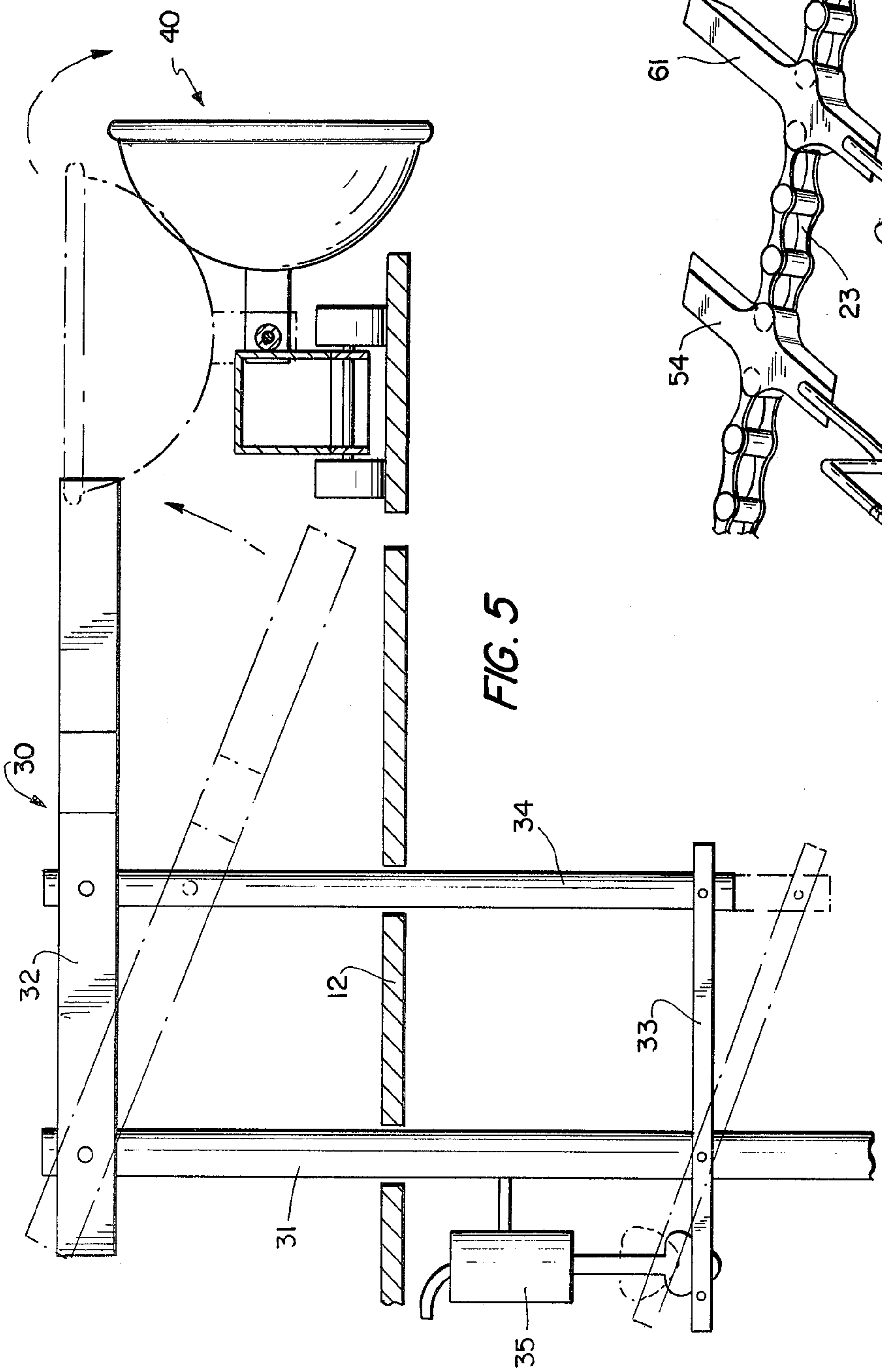
FIG. 5 is an elevational view of one of the tipping devices according to the present invention.

FIG. 5 discloses a tipping mechanism of which there are a plurality along one side edge of the top surface 12. The desired number depends upon the particular weight ranges, and the desired number of locations for containers. Each tipper 30 includes a tipping plate 32 pivotally mounted at an upper end of a fixed rod 31. A lever 33 is pivotally mounted on the fixed rod 31. A connecting rod 34 interconnects one end of the lever to an intermediate position on the tipping plate. An electrically controlled solenoid 35 is also mounted on the rod 31 in a position to co-act with the lever 33. The operative end of the solenoid 35 can have a conically shaped head which co-acts with a rotatable pin on the end of the lever.

FIG. 5 shows a trolley with a cup in upright position in dotted lines with the tipping plate in its normal position in dotted lines. The solid lines indicate the tipper has been operated and has tipped the cup of the trolley to dump the contents thereof overboard.

The drive gear 26 has timer pins 52 extending downwardly therefrom. A sensor 51 is provided on the frame 10 in operative engagement with the driving pins to count the number of driving pins and feed a signal to a control means. A further sensor 62 is provided on the frame positioned to be engaged only by the tare extension 61 of the chain.

The weighing deck 16 includes a load cell 17 and bracket upon which the same is mounted.

A tare trolley 60 is provided having exactly the same weight as an empty trolley 40. The tare trolley is always driven by the drive extension 25 opposite the tare indicator 61.

The control box 53 is electronically connected to the load cell 17, the plurality of trippers 30 and the tare sensor 62. The control box includes a programmable control unit having a timing counter, a memory unit and other necessary circuitry to accomplish the purpose of selectively operating one of the tippers at a predetermined location to tip one of the cups of the trolleys based upon the weight of the contents in the cup measured at the weighing means, and the amount of time necessary for that particular trolley to reach that particular predetermined location.

The control box 53 receives a timing count from the timing indicators 52 on the drive gear 26 as read by the sensor 51. In considering a particular trolley, as the same comes onto the weighing deck 16, it is weighed by the load cell 17 and the signal is passed to the control box 53. Based upon the net weight of the contents of that particular trolley, the control box waits until a certain number of timing intervals have elapsed as indicated by the sensor 51 co-acting with the timing indicator 52 before the control box 53 trips the appropriate solenoid 35 of the appropriate tipper 30.

Each cup 41 of each trolley 40 being mounted on bracket 43 is easily tippable from an upright position to a down position by the upward movement of the appropriate tipping plate 32.

After a certain period of time, the control box 53 may have the zero weight of each trolley wander. Consequently, tare trolley 60 is provided which has a weight equal to that of an empty trolley 40. As the tare trolley 60 comes around the top surface and the tare indicator 61 engages with sensor 62, a signal is sent to the control box 53 to have the same correct its memory as to the zero weight of the trolleys. Since the tare trolley is the only trolley driven by the chain by an extension 25 having a tare indicator 61 opposite thereto, the only time that the control box 53 is corrected is when the tare trolley is appropriately positioned over the weighing deck 16.

The various pieces of apparatus can obviously be made of different materials. However, the most preferred material of construction is stainless steel. The rub rail 18 can be made of a long stainless steel rod, preferably covered by polytetrafluoroethylene. Additionally, the tipping plates 32 can also be polytetrafluoroethylene. The materials must be USDA approved material for food manufacturer use.

In operation, a person would stand approximately midway along the top edge of the surface on the near side of FIG. 1 and place separate deboned chicken parts into each one of the cups as it travels by on its trolley 40. The trolley 40 is carried by the driving extension 25 of the chain conveyor to the weighing deck 16 where it is weighed. The weight is temporarily retained in the memory of the control box 53 until the trolley has been carried around in front of the appropriate tipper on the opposite side of the top surface. Upon reaching this predetermined location, the appropriate tipper is tripped and the cup is tipped over, dumping the contents into a container on the floor (not shown). A water spray unit can be mounted adjacent the top surface near the position where the rub rail 18 rises from the surface to clean the interior of each tipped cup as it passes. The trolley thereafter moves past this cleaning means and the tipped cup rides up on the polytetrafluoroethylene rub rail 18, thereby being uprighted.

Thus, individual pieces of meat can be automatically weight graded and sorted.

It is readily apparent that the above described automatic weight grading and sorting apparatus meets all of the objects mentioned above and also has the advantage of wide commercial utility. It should be understood that the specific form of the invention hereinabove described is intended to be representative only as certain modifications within the scope of these teachings will be apparent to those skilled in the art.

Accordingly, reference should be made to the following claims in determining the full scope of the invention.

What is claimed is:

1. A weight grading and sorting apparatus comprising:

a base having a top surface;

trolley means riding on said top surface and having tippable means for carrying contents to be weighed and sorted;

endless conveyor means mounted on said base for conveying said trolley means around said top surface;

means in said base for individually successively weighing each of said trolley means and contents;

tare means riding on said top surface having a weight equal to an empty tippable means;

means in said weighing means for zeroing said weighing means;

means associated with said conveyor means for signalling to said weighing means and said tipping means that said tare means is present on said weighing means; and means associated with said means for weighing for selectively tipping each means for carrying at a predetermined position, remote from said means for weighing, based on the weight of said contents.

2. The apparatus as claimed in claim 1 further comprising means mounted on said top surface for uprighting each tipped means for carrying.

3. The apparatus as claimed in claim 2 wherein said means for uprighting comprises an arcreate rub rail mounted circumferentially of said top surface extending from said top surface to a level above said top surface sufficient to upright each tipped means for carrying as it successively rubs against the rail.

4. The apparatus as claimed in claim 1 wherein said trolley means comprises a plurality of trolleys, each trolley including a frame, wheels rollingly mounted on said frame, and a forward extension extending forwardly of said frame; and wherein said tippable means comprises a cup tippably mounted on said frame.

5. The apparatus as claimed in claim 1 wherein said top surface has an oval-shaped slot therein and said endless conveyor means comprises a drive gear rotatably mounted at one end of said base below said top surface, an idler gear rotatably mounted at the other end of said base below said top surface, means for driving said drive gear, and an endless chain drivingly supported by said drive gear and said idler gear, said chain having a plurality of drive members at spaced apart locations thereon, each drive member extending through said slot and engaging a portion of trolley means.

6. The apparatus as claimed in claim 1 wherein said means for individually successively weighing comprises a weighing deck positioned level with said top surface and in the path of movement of said trolley means, a load cell totally supporting said deck, and a bracket fixed to said base supporting said load cell, said load cell producing an electrical signal proportionate to the weight of an object upon it.

7. The apparatus as claimed in claim 1 wherein said means for selectively tipping includes a plurality of tippers, each tipper being located at a predetermined position and comprising a vertically fixed rod, a tipping plate pivotally mounted at one end of said rod, a lever having two ends and being pivotally mounted between its ends on said rod, a connecting arm connected between an end of said lever and an intermediate portion of said tipping plate, and electrical means operatively associated with said means for weighing, including solenoid means mounted on said rod adjacent the other end of said lever for co-acting with said lever to tip the tipping plate upon an appropriate signal.

8. The apparatus as claimed in claim 1 wherein said means for selectively tipping includes a plurality of tipping means mounted at predetermined positions of said top surface, timing means associated with said conveyor means, and control means electrically connected to said timing means and said weighing means and operatively connected to said plurality of tipping means for selectively operating one of said tipping means at the predetermined location to tip one of said tippable means based on the weight of the contents measured at the weighing means and the amount of time necessary for that particular tippable means to reach that particular predetermined location.

9. A weight grading and sorting apparatus comprising:

- a base having a top surface;
- a plurality of trolleys riding on said top surface, each having a tippable cup;
- an endless conveyor mounted on said base engaging and conveying said plurality of trolleys around said top surface;
- a weighing device in said base including a portion of said top surface;
- tare means riding on said top surface having a weight equal to an empty tippable means;
- means in said weighing means for zeroing said weighing means;
- means associated with said conveyor means for signalling to said weighing means and said tipping means that said tare means is present on said weighing means; and
- a control device in said base operatively associated with said weighing device and including a plurality of tippers at separate positions around said base adapted to selectively tip each cup at a certain position based on the weight of the contents thereof.

10. Method of automatically grading and sorting objects by weight comprising the steps of:

- placing individual objects into a trolley means riding on a top surface of a base, the trolley means having tippable means for carrying the objects to be weighed and sorted;
- conveying the trolley means around the top surface by an endless conveyor means mounted on said base;
- successively weighing each of the trolley means and object therein by a weighing means;
- selectively tipping each tippable means at a predetermined position, remote from said weighing means, based on the weight of the object;
- conveying a tare means around the top surface by the endless conveyor means, the tare means having a weight equal to an empty tippable means; and
- zeroing said weighing means each time said tare means is present on said weighing means.

11. The method as claimed in claim 10 further comprising the step of uprighting the tipped tippable means.

12. The method as claimed in claim 10 wherein the step of weighing includes positioning the individual trolley means on a weighing deck flush with the top surface, the weight of the trolley means and object therein producing an electrical signal in a load cell supporting the weighing deck proportionate to the weight.

13. The method as claimed in claim 10 wherein the step of successively tipping includes:

- timing the movement of the trolley means with object therein from the weighing means to one of a plurality of predetermined positions;
- controlling a plurality of tipping means, each at one predetermined position, to selectively tip one of the tippable means at said one predetermined position as the tippable means passes that position based on the weight of the object measured at the weighing means and the amount of time necessary for that particular tippable means to reach that particular predetermined position.

14. A weight grading and sorting apparatus comprising

- a base having a top surface;
- trolley means riding on said top surface and having tippable means for carrying contents to be weighed and sorted;
- endless conveyor means mounted on said base for conveying said trolley means around said top surface;
- means in said base for individually successively weighing each of said trolley means and contents; and
- means associated with said means for weighing for selectively tipping each means for carrying at a predetermined position, remote from said means for weighing, based on the weight of said contents; said means for selectively tipping including:
- a plurality of tippers, each tipper being located at a predetermined position and comprising a vertically fixed rod, a tipping plate pivotally mounted at one end of said rod, a lever having two ends and being pivotally mounted between its ends on said rod, a connecting arm connected between an end of said lever and an intermediate portion of said tipping plate, and electrical means operatively associated with said means for weighing, including solenoid means mounted on said rod adjacent the other end of said lever for co-acting with said lever to tip the tipping plate upon an appropriate signal.

15. A weight grading and sorting apparatus comprising

- a base having a top surface;

a plurality of trolley riding on said top surface, each having a tippable cup;

an endless conveyor mounted on said base engaging and conveying said plurality of trolleys around said top surface;

a weighing device in said base including a portion of said top surface; and a control device in said base operatively associated with said weighing device and including a plurality of tippers at separate positions around said base adapted to selectively tip each cup at a certain position based on the weight of the contents thereof; each tipper comprising:

a vertically fixed rod, a tipping plate pivotally mounted at one end of said rod, a lever having two ends and being pivotally mounted between its ends on said rod, a connecting arm connected between an end of said lever and an intermediate portion of said tipping plate, and electrical means operatively associated with said weighing device, including a solenoid mounted on said rod adjacent the other end of said lever for co-acting with said lever to tip the tipping plate upon an appropriate signal.

* * * * *